(12) United States Patent
Shuang et al.

(10) Patent No.: US 11,458,448 B2
(45) Date of Patent: Oct. 4, 2022

(54) MAGNETIC STRONG BASE ANION EXCHANGE RESIN WITH HIGH MECHANICAL STRENGTH, AND PREPARATION METHOD THEREOF

(71) Applicants: NANJING UNIVERSITY, Nanjing (CN); NANJING UNIVERSITY & YANCHENG ACADEMY OF ENVIRONMENTAL PROTECTION TECHNOLOGY AND ENGINEERING, Yancheng (CN)

(72) Inventors: Chendong Shuang, Nanjing (CN); Guang Zhang, Nanjing (CN); Aimin Li, Nanjing (CN); Ting Ye, Nanjing (CN); Zheng Wang, Nanjing (CN)

(73) Assignees: NANJING UNIVERSITY, Nanjing (CN); NANJING UNIVERSITY & YANCHENG ACADEMY OF ENVIRONMENTAL PROTECTION TECHNOLOGY AND ENGINEERING, Yancheng (CN)

( * ) Notice: Subject to any disclaimer, the term of this patent is extended or adjusted under 35 U.S.C. 154(b) by 294 days.

(21) Appl. No.: 16/764,846

(22) PCT Filed: Apr. 20, 2018

(86) PCT No.: PCT/CN2018/083895
§ 371 (c)(1),
(2) Date: May 16, 2020

(87) PCT Pub. No.: WO2019/095628
PCT Pub. Date: May 23, 2019

(65) Prior Publication Data
US 2020/0338523 A1 Oct. 29, 2020

(30) Foreign Application Priority Data
Nov. 17, 2017 (CN) .......................... 201711147966.8

(51) Int. Cl.
*B01J 20/02* (2006.01)
*B01J 41/10* (2006.01)
(Continued)

(52) U.S. Cl.
CPC ......... *B01J 20/0229* (2013.01); *B01J 20/265* (2013.01); *B01J 20/28009* (2013.01);
(Continued)

(58) Field of Classification Search
None
See application file for complete search history.

(56) References Cited

U.S. PATENT DOCUMENTS 5,166,370 A * 11/1992 Liotta, Jr. ............ C07D 307/08
568/862
5,874,019 A * 2/1999 Uchida ................ G03G 9/0834
428/404

(Continued)

FOREIGN PATENT DOCUMENTS

CN 1233534 A * 11/1999
CN 103467645 A * 12/2013

*Primary Examiner* — Joseph D Anthony
(74) *Attorney, Agent, or Firm* — CBM Patent Consulting, LLC

(57) ABSTRACT

A magnetic strong base anion exchange resin with high mechanical strength and a preparation method thereof, belonging to the field of resin materials. The preparation method comprises steps of: adding a conventional strong base anion exchange resin to a mixture of trivalent iron salt and divalent iron salt, and then mixing the resin adsorbed with the iron salt with aqueous ammonia so that $Fe_3O_4$ nanoparticles are contained in the resin structure. Then, the resin containing $Fe_3O_4$ nanoparticles is added to alcoholic solution dissolved with silane coupling agent to form a (Continued)

dense $SiO_2$ coating on the surface of the resin, so as to obtain magnetic strong base anion exchange resin with high mechanical strength.

4 Claims, 3 Drawing Sheets

(51) Int. Cl.
*B01J 20/30* (2006.01)
*B01J 20/28* (2006.01)
*B01J 20/26* (2006.01)
*C02F 1/42* (2006.01)

(52) U.S. Cl.
CPC ........... *B01J 20/3085* (2013.01); *B01J 41/10* (2013.01); *C02F 1/42* (2013.01)

(56) References Cited

U.S. PATENT DOCUMENTS

| | | | |
|---|---|---|---|
| 2005/0109976 A1* | 5/2005 | Fuchs | H01F 1/447 252/62.53 |
| 2008/0296530 A1* | 12/2008 | Fuchs | B82Y 25/00 252/62.54 |
| 2012/0025128 A1* | 2/2012 | Fuchs | B82Y 25/00 252/62.54 |
| 2016/0207796 A1* | 7/2016 | Li | C08F 292/00 |

* cited by examiner

MAGNETIC STRONG BASE ANION EXCHANGE RESIN WITH HIGH MECHANICAL STRENGTH, AND PREPARATION METHOD THEREOF

TECHNICAL FIELD OF THE INVENTION

The present invention relates to a magnetic strong base anion exchange resin and a preparation method thereof, and in particular to a magnetic strong base anion exchange resin with high mechanical strength, having a $SiO_2$ coating formed on its surface, and a preparation method thereof, belonging to the field of resin materials.

BACKGROUND OF THE INVENTION

At present, due to their advantages of high treatment capacity, high removal rate, simple operation, good quality of treated water, recyclability and the like, ion exchange resins have been widely applied in the field of water treatment. Conventional acrylic strong base anion exchange resins have high hydrophilicity, high exchange capability and exchange capacity for weak acid organics, high resolution rate to organics, and low degree of pollution by organics. Moreover, macroporous acrylic strong base anion exchange resins can better adsorb macromolecular organics such as humic acid and fulvic acid than macroporous styrene ion exchange resins, and can be eluted more easily. For example, Amberlite IRA-958 resin is widely applied in the deep treatment of ionic substance, industrial wastewater with a high content of organics and urban domestic sewage. Scholars in China have accordingly developed magnetic acrylic ion exchange resin materials, such as the magnetic acrylic strong base anion exchange microsphere resin disclosed in CN101781437A and the magnetic acrylic weak acid cation exchange microsphere resin disclosed in CN101948554A. In the method disclosed in CN1699447A, $Fe_3O_4$ particles are dispersed in the oil phase by using a stabilizer containing the amino group. However, its disadvantage is that the stabilizer reacts with the active groups in the monomer, resulting in a low exchange capacity. In the method disclosed in CN1233534A, nanoscale solid magnetic ion exchange resin spheres are prepared by chemical precipitation by using aqueous ammonia as precipitant. Although the prepared nanoscale resin microspheres are magnetic, in practical applications, the nanoscale resin is likely to become gel in water. It is difficult to realize real separation, and thus it is difficult to implement large-scale practical engineering applications.

However, such acrylic strong base anion exchange resins (both conventional particle resins and magnetic powdered resins) use conventional acrylates or glycidyl acrylate as monomers and thus are low in mechanical strength. Moreover, as for magnetic resins, magnetic materials may fall off the magnetic resins. For example, as for the magnetic anion exchange resin prepared using a complexing agent in CN1699447A, in practical applications, the magnetic material on its surface may fall off, resulting in secondary pollution to water. Meanwhile, during the water treatment process, the material loss will be caused, the quality of water will be deteriorated and the cost will be increased. Due to these deficiencies, the further development and application of magnetic resin materials are limited.

In summary, how to prepare a magnetic ion exchange resin with high structural stability and mechanical strength is still a technical problem to be urgently solved.

SUMMARY OF THE INVENTION

An objective of the present invention is to provide a magnetic strong base anion exchange resin with high mechanical strength on the basis of the prior art. The resin is strong base anion exchange resin particles, the resin particles contain iron-containing magnetic particles, and a SiO2 coating is coated on the surfaces of the resin particles.

Another objective of the present invention is to provide a method for preparing the magnetic strong base anion exchange resin with high mechanical strength.

The present invention employs the following technical solutions.

A magnetic strong base anion exchange resin with high mechanical strength is provided, wherein the resin is strong base anion exchange resin particles, the resin particles contain iron-containing magnetic particles, and a SiO2 coating is coated on the surfaces of the resin particles.

Further, the strong base anion exchange resin particles are acrylic strong base anion exchange resin particles, and the iron-containing magnetic particles are $Fe_3O_4$ nanoparticles or $Fe_2O_3$ nanoparticles.

The magnetic strong base anion exchange resin with high mechanical strength provided by the present invention is prepared by the following steps of:

(1) preparing iron salt solution containing trivalent iron salt and divalent iron salt, adding a strong base anion exchange resin to the ion salt solution, and mixing uniformly;

(2) separating the resin from the mixture obtained in the step (1), drying, and reacting with aqueous ammonia at 35° C. to 95° C.;

(3) adding silane coupling agent and alcohol to the reaction solution obtained in the step (2), or adding alcoholic solution of silane coupling agent to the reaction solution obtained in the step (2), and reacting at 25° C. to 75° C.; and (4) separating the resin from the reaction solution obtained in the step (3), and then adding silane coupling agent, alcohol and aqueous ammonia; or, separating the resin from the reaction solution obtained in the step (3), and then adding alcoholic solution of silane coupling agent and aqueous ammonia; and, reacting at 25° C. to 75° C.

In one solution, in the step (1), the mass ratio of the trivalent iron salt to the divalent iron salt in the iron salt solution is 1:0.5 to 10:1, preferably 1:1 to 5:1.

In one preferred solution, in the step (1), the trivalent iron salt is one or more of ferric chloride hydrate, ferric sulfate hydrate and ferric nitrate hydrate, and the divalent iron salt is one or more of ferrous chloride hydrate, ferrous sulfate hydrate and ferrous nitrate hydrate.

In another solution, in the step (1), the mass fraction of the iron salt solution is 5% to 50%, preferably 5% to 40%; and the ratio of the mass of the strong base anion exchange resin to the total mass of the trivalent iron salt and the divalent iron salt is 1:3 to 1:60, preferably 1:7.5 to 1:48.

In one solution, in the step (2), the mass fraction of ammonia in the aqueous ammonia is 2% to 40%, preferably 3% to 35% and more preferably 10% to 32%.

In another solution, in the step (2), the mass ratio of the resin to the ammonia is 1:0.1 to 1:55, preferably 1:02 to 1:3.5; the reaction temperature is 35° C. to 95° C.; and the reaction time is 0.5 h to 3 h.

In one solution, in the step (3) or (4), the silane coupling agent is one or more of methoxysilane coupling agent and ethoxysilane coupling agent.

In one preferred solution, in the step (3) or (4), the alcohol is one or more of methanol, ethanol, propanol and isopropanol.

In another solution, in the step (3) or (4), the mass-to-volume ratio of the resin to the silane coupling agent is 1:0.1 to 1:8 g/mL, preferably 1:0.2 to 1:5 g/mL; the volume ratio of the silane coupling agent to the alcohol is 1:1 to 1:60, preferably 1:5 to 1:50; the reaction temperature is 25° C. to 75° C.; and the reaction time is 0.5 h to 6 h.

In one solution, at the end of reaction in the step (4), the resin is washed to obtain the magnetic strong base anion exchange resin.

In another solution, in the step (4), the mass fraction of ammonia in the aqueous ammonia is 2% to 40%, preferably 3% to 35% and more preferably 10% to 32%; and the mass ratio of the resin to the ammonia is 1:0.1 to 1:5.5, preferably 1:0.2 to 1:3.5.

The magnetic strong base anion exchange resin with high mechanical strength provided by the present invention has a strong base anion exchange capacity of 2.0 to 4.3 mmol/g, a moisture holding capacity of 40% to 70%, a Fe content of 20% to 40%, an Si content of 0.001% to 2.212% and a sphericity after attrition of 80% to 99%.

The magnetic strong base anion exchange resin with high mechanical strength provided by the present invention has a true density in wet state of 1.1 to 1.5 g/mL and a bulk density in wet state of 0.7 to 1.0 g/mL.

The magnetic strong base anion exchange resin with high mechanical strength provided by the present invention has a deposition rate of 65 to 100 m/h in pure water at 25° C.

The magnetic strong base anion exchange resin with high mechanical strength provided by the present invention has a Fe dissolution rate of 0.5% to 2.1% after being immersed in a 1 mol/L hydrochloric acid solution.

A method for preparing a magnetic strong base anion exchange resin with high mechanical strength is provided, including the following steps of:

(1) preparing iron salt solution containing trivalent iron salt and divalent iron salt, adding a strong base anion exchange resin to the ion salt solution, and mixing uniformly;

(2) separating the resin from the mixture obtained in the step (1), drying, and reacting with aqueous ammonia at 35° C. to 95° C.;

(3) adding silane coupling agent and alcohol to the reaction solution obtained in the step (2), or adding alcoholic solution of silane coupling agent to the reaction solution obtained in the step (2), and reacting at 25° C. to 75° C.; and (4) separating the resin from the reaction solution obtained in the step (3), and then adding silane coupling agent, alcohol and water; or, separating the resin from the reaction solution obtained in the step (3), and then adding alcoholic solution of silane coupling agent and water; and, reacting at 25° C. to 75° C.

In one solution, during the resin preparation process, in the step (1), the mass ratio of the trivalent iron salt to the divalent iron salt in the iron salt solution is 1:0.5 to 10:1, preferably 1:1 to 5:1.

In one preferred solution, during the resin preparation process, in the step (1), the trivalent iron salt is one or more of ferric chloride hydrate, ferric sulfate hydrate and ferric nitrate hydrate, and the divalent iron salt is one or more of ferrous chloride hydrate, ferrous sulfate hydrate and ferrous nitrate hydrate.

In another solution, during the resin preparation process, in the step (1), the mass fraction of the iron salt solution is 5% to 50%, preferably 5% to 40%; and the ratio of the mass of the strong base anion exchange resin to the total mass of the trivalent iron salt and the divalent iron salt is 1:3 to 1:60, preferably 1:7.5 to 1:48.

In one solution, during the resin preparation process, in the step (2), the mass fraction of ammonia in the aqueous ammonia is 2% to 40%, preferably 3% to 35% and more preferably 10% to 32%.

In another solution, during the resin preparation process, in the step (2), the mass ratio of the resin to the ammonia is 1:0.1 to 1:55, preferably 1:02 to 1:3.5; the reaction temperature is 35° C. to 95° C.; and the reaction time is 0.5 h to 3 h.

In one solution, during the resin preparation process, in the step (3) or (4), the silane coupling agent is one or more of methoxysilane coupling agent and ethoxysilane coupling agent.

In one preferred solution, during the resin preparation process, in the step (3) or (4), the alcohol is one or more of methanol, ethanol, propanol and isopropanol.

In another solution, during the resin preparation process, in the step (3) or (4), the mass-to-volume ratio of the resin to the silane coupling agent is 1:0.1 to 1:8 g/mL, preferably 1:0.2 to 1:5 g/mL; the volume ratio of the silane coupling agent to the alcohol is 1:1 to 1:60, preferably 1:5 to 1:50; the reaction temperature is 25° C. to 75° C.; and the reaction time is 0.5 h to 6 h.

In one solution, during the resin preparation process, at the end of reaction in the step (4), the resin is washed to obtain the magnetic strong base anion exchange resin.

In another solution, during the resin preparation process, in the step (4), the mass fraction of ammonia in the aqueous ammonia is 2% to 40%, preferably 3% to 35% and more preferably 10% to 32%; and the mass ratio of the resin to the ammonia is 1:0.1 to 1:5.5, preferably 1:0.2 to 1:3.5.

The technical solutions of the present invention have the following advantages.

In the magnetic strong base anion exchange resin with high mechanical strength and the preparation method thereof provided by the present invention, the resin has a strong base anion exchange capacity of 2.0 to 4.3 mmol/g, a moisture holding capacity of 40% to 70%, a Fe content of 20% to 40%, an Si content of 0.001% to 2.212%, a Fe dissolution rate of 0.5% to 2.1%, a sphericity after attrition of 80% to 99%, a true density in wet state of 1.1 to 1.5 g/mL, a bulk density in wet state of 0.7 to 1.3 g/mL, and a deposition rate of 65 to 100 m/h in pure water at 25° C.

The magnetic resin prepared by the method of the present invention can enhance the mechanical strength of resin, and the sphericity after attrition of the resin can reach 95% or above, which is far higher than that of the conventional acrylic anion exchange resin. Moreover, the resin is highly magnetic, high in true density in wet state and deposition rate, and easy to separate in practical applications. In addition, the exchange capacity of the resin is not sacrificed, and the resin can be applied to the separation or removal of dissolved organics, precursors of disinfection by-products and various anions such as sulfides, sulfates, phosphates and nitrates in various wastewater, drinking water or natural water. Furthermore, the magnetic resin is high in acid resistance and high in mechanical strength. The service life of the resin in practical applications can be prolonged. The resin plays a more stable role when in use, and the cost for treatment is reduced.

DETAILED DESCRIPTION OF THE INVENTION

Figure 1:
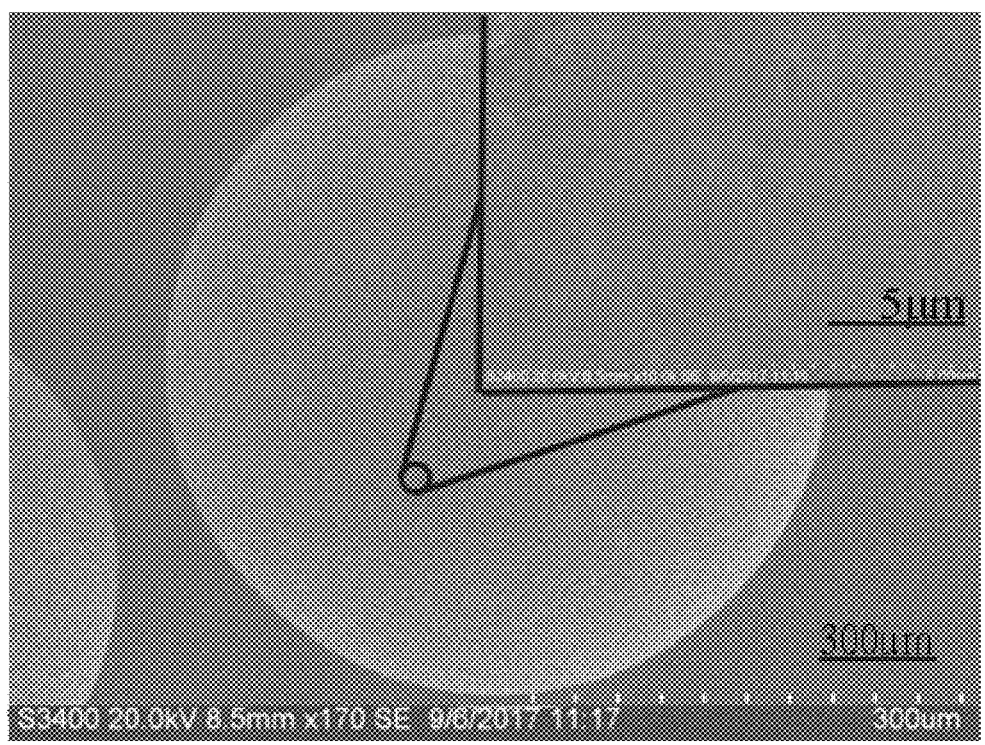
FIG. 1 is an electron micrograph of an anion exchange resin D213 made in China in Embodiment 1.
Figure 2:
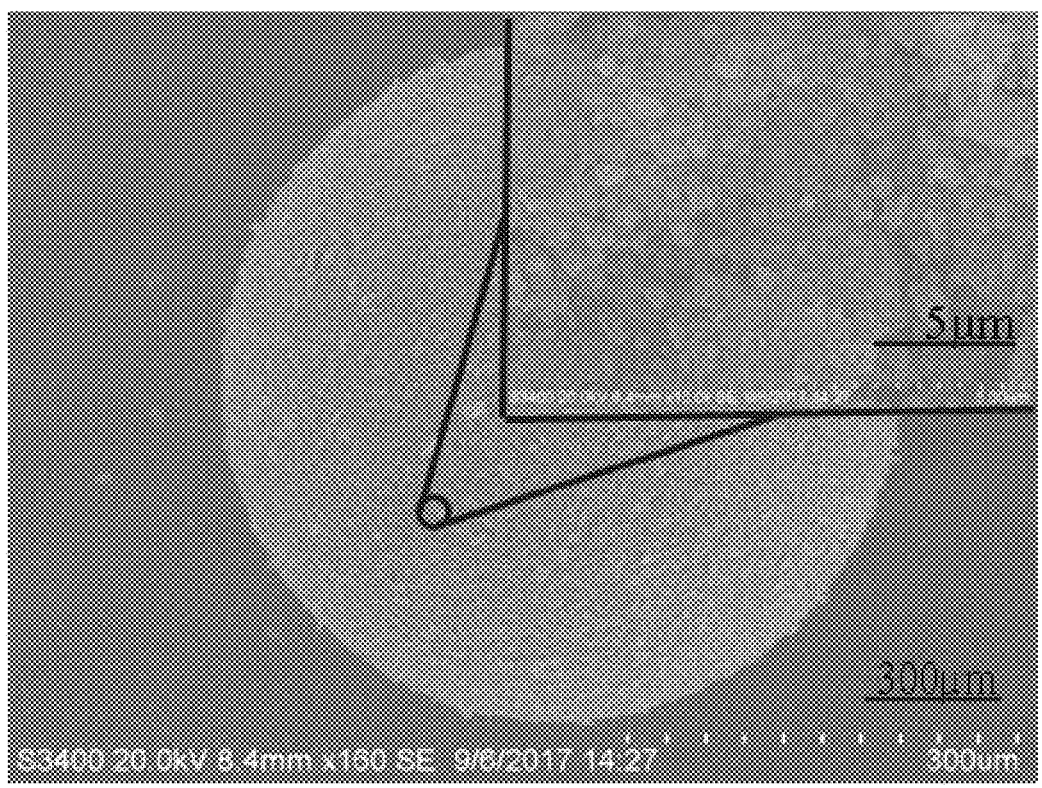
FIG. 2 is an electron micrograph of a magnetic strong base anion exchange resin finally synthesized in Embodiment 1.
Figure 3:
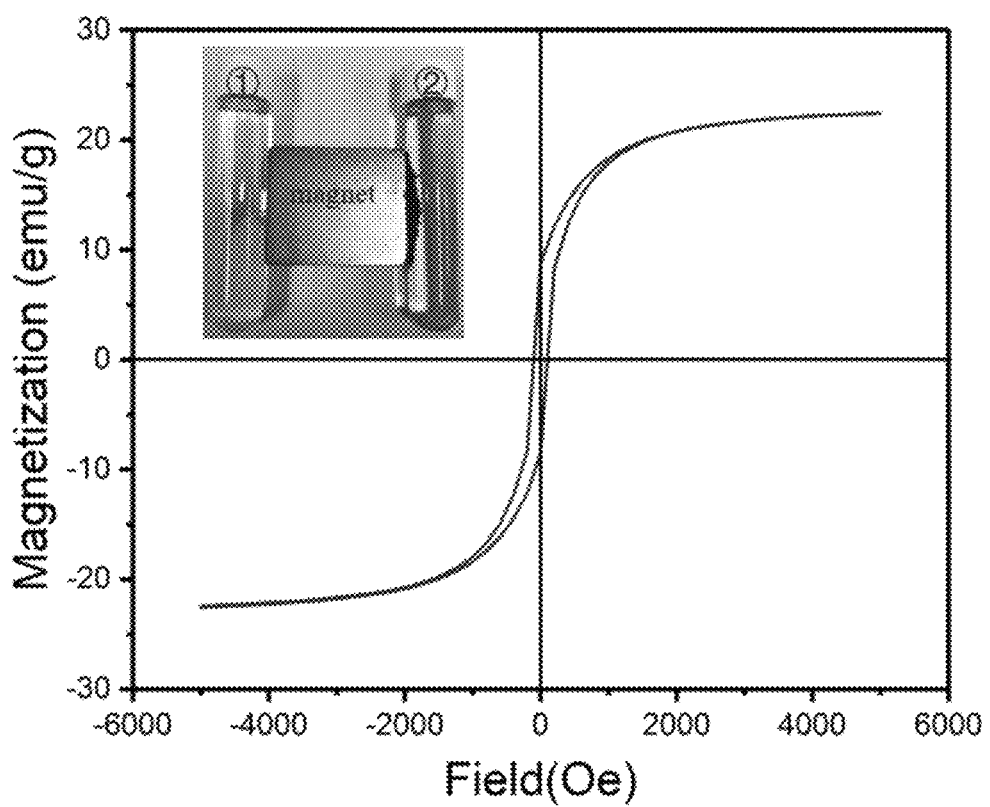
FIG. 3 shows a hysteresis loop of the magnetic strong base anion exchange resin finally synthesized in Embodiment 1, where the test tubes ① and ② at the upper left contain the anion exchange resin D213 made in China in Embodiment 1 and the magnetic strong base anion exchange resin finally synthesized in Embodiment 1, respectively.

The magnetic strong base anion exchange resin with high mechanical strength and preparation method thereof provided by the present invention will be further described by the following embodiments.

Embodiment 1

80 g of ferric chloride hydrate and 80 g of ferrous chloride hydrate were dissolved in water to obtain iron salt solution having a mass fraction of 5%, and then added with 10 g of an anion exchange resin D213 (the anion exchange resin D213 made in China, by Jiangsu Jinkai Resin Chemical Co., Ltd.). The temperature of the reactor was adjusted to 75° C., 100 ml of aqueous ammonia having a mass concentration of 32% was added in the reactor, and the reaction system was reacted for 1 h. Then, the temperature of the reactor was adjusted to 50° C., 10 ml of tetraethyl silicate and 100 ml of methanol were added in the reactor, and the reaction system was reacted for 1 h. Subsequently, the resin was separated from the mixture and then added with 10 ml of aqueous ammonia having a mass concentration of 32%, 10 ml of tetraethyl silicate and 100 ml of methanol, and the reaction system was reacted for 1 h at 50° C. At the end of reaction, the resin was dried. The performances of the synthesized magnetic resin were shown in Table 1.

Embodiment 2

80 g of ferric chloride hydrate and 40 g of ferrous chloride hydrate were dissolved in water to obtain iron salt solution having a mass fraction of 15%, and then added with 8 g of an anion exchange resin D205 (the anion exchange resin D205 made in China, by Jiangsu Jinkai Resin Chemical Co., Ltd.). The temperature of the reactor was adjusted to 90° C., 70 ml of aqueous ammonia having a mass concentration of 10% was added in the reactor, and the reaction system was reacted for 0.5 h. Then, the temperature of the reactor was adjusted to 70° C., 10 ml of vinyltrimethoxysilane and 50 ml of methanol were added in the reactor, and the reaction system was reacted for 2 h. Subsequently, the resin was separated from the mixture and then added with 20 ml of aqueous ammonia having a mass concentration of 10%, 10 ml of vinyltrimethoxysilane and 50 ml of methanol, and the reaction system was reacted for 2 h at 70° C. At the end of reaction, the resin was dried. The performances of the synthesized magnetic resin were shown in Table 1.

Embodiment 3

80 g of ferric chloride hydrate and 25 g of ferrous sulfate hydrate were dissolved in water to obtain iron salt solution having a mass fraction of 25%, and then added with 5 g of an anion exchange resin (Purolite®A520E). The temperature of the reactor was adjusted to 70° C., 40 ml of aqueous ammonia having a mass concentration of 25% was added in the reactor, and the reaction system was reacted for 2 h. Then, the temperature of the reactor was adjusted to 40° C., 5 ml of vinyltrimethoxysilane and 100 ml of ethanol were added in the reactor, and the reaction system was reacted for 4 h. Subsequently, the resin was separated from the mixture and then added with 10 ml of aqueous ammonia having a mass concentration of 25%, 5 ml of vinyltrimethoxysilane and 100 ml of ethanol, and the reaction system was reacted for 5 h at 40° C. At the end of reaction, the resin was dried. The performances of the synthesized magnetic resin were shown in Table 1.

Embodiment 4

80 g of ferric sulfate hydrate and 20 g of ferrous sulfate hydrate were dissolved in water to obtain iron salt solution having a mass fraction of 40%, and then added with 4 g of a magnetic acrylic strong base anion exchange microsphere resin (the resin disclosed in Chinese Patent CN101781437A). The temperature of the reactor was adjusted to 55° C., 30 ml of aqueous ammonia having a mass concentration of 10% was added in the reactor, and the reaction system was reacted for 3 h. Then, the temperature of the reactor was adjusted to 30° C., 5 ml of tetraethyl silicate and 150 ml of ethanol were added in the reactor, and the reaction system was reacted for 3 h. Subsequently, the resin was separated from the mixture and then added with 10 ml of aqueous ammonia having a mass concentration of 10%, 5 ml of tetraethyl silicate and 150 ml of ethanol, and the reaction system was reacted for 2 h at 30° C. At the end of reaction, the resin was dried. The performances of the synthesized magnetic resin were shown in Table 1.

Embodiment 5

80 g of ferric chloride hydrate and 16 g of ferrous chloride hydrate were dissolved in water to obtain iron salt solution having a mass fraction of 25%, and then added with 2 g of an anion exchange resin D213 (the anion exchange resin D213 made in China, by Jiangsu Jinkai Resin Chemical Co., Ltd.). The temperature of the reactor was adjusted to 40° C., 10 ml of aqueous ammonia having a mass concentration of 32% was added in the reactor, and the reaction system was reacted for 0.5 h. Then, the temperature of the reactor was adjusted to 55° C., 2 ml of vinyltrimethoxysilane and 80 ml of methanol were added in the reactor, and the reaction system was reacted for 6 h. Subsequently, the resin was separated from the mixture and then added with 5 ml of aqueous ammonia having a mass concentration of 32%, 2 ml of vinyltrimethoxysilane and 80 ml of methanol, and the reaction system was reacted for 3 h at 55° C. At the end of reaction, the resin was dried. The performances of the synthesized magnetic resin were shown in Table 1.

Embodiment 6

40 g of ferric sulfate hydrate and 40 g of ferrous sulfate hydrate were dissolved in water to obtain iron salt solution having a mass fraction of 15%, and then added with 10 g of an anion exchange resin D205 (the anion exchange resin D205 made in China, by Jiangsu Jinkai Resin Chemical Co., Ltd.). The temperature of the reactor was adjusted to 55° C., 10 ml of aqueous ammonia having a mass concentration of 30% was added in the reactor, and the reaction system was reacted for 1 h. Then, the temperature of the reactor was adjusted to 45° C., 2 ml of tetraethyl silicate and 100 ml of methanol were added in the reactor, and the reaction system was reacted for 2 h. Subsequently, the resin was separated from the mixture and then added with 100 ml of aqueous ammonia having a mass concentration of 30%, 2 ml of tetraethyl silicate and 100 ml of methanol, and the reaction system was reacted for 0.5 h at 45° C. At the end of reaction, the resin was dried. The performances of the synthesized magnetic resin were shown in Table 1.

Embodiment 7

40 g of ferric chloride hydrate and 20 g of ferrous chloride hydrate were dissolved in water to obtain iron salt solution having a mass fraction of 10%, and then added with 8 g of a magnetic styrene strong base anion exchange microsphere resin (the resin disclosed in Chinese Patent CN101708475B). The temperature of the reactor was adjusted to 65° C., 20 ml of aqueous ammonia having a mass concentration of 25% was added in the reactor, and the reaction system was reacted for 2 h. Then, the temperature of the reactor was adjusted to 30° C., 5 ml of tetraethyl silicate and 150 ml of methanol were added in the reactor, and the reaction system was reacted for 3 h. Subsequently, the resin was separated from the mixture and then added with 70 ml of aqueous ammonia having a mass concentration of 25%, 5 ml of tetraethyl silicate and 150 ml of methanol, and the reaction system was reacted for 6 h at 30° C. At the end of reaction, the resin was separated and dried. The performances of the synthesized magnetic resin were shown in Table 1.

Embodiment 8

40 g of ferric chloride hydrate and 15 g of ferrous chloride hydrate were dissolved in water to obtain iron salt solution having a mass fraction of 5%, and then added with 5 g of an anion exchange resin D213 (the anion exchange resin D213 made in China, by Jiangsu Jinkai Resin Chemical Co., Ltd.). The temperature of the reactor was adjusted to 75° C., 30 ml of aqueous ammonia having a mass concentration of 20% was added in the reactor, and the reaction system was reacted for 3 h. Then, the temperature of the reactor was adjusted to 55° C., 5 ml of vinyltrimethoxysilane and 100 ml of methanol were added in the reactor, and the reaction system was reacted for 0.5 h. Subsequently, the resin was separated from the mixture and then added with 30 ml of aqueous ammonia having a mass concentration of 20%, 5 ml of vinyltrimethoxysilane and 100 ml of methanol, and the reaction system was reacted for 3 h at 55° C. At the end of reaction, the resin was dried. The performances of the synthesized magnetic resin were shown in Table 1.

Embodiment 9

40 g of ferric sulfate hydrate and 10 g of ferrous chloride hydrate were dissolved in water to obtain iron salt solution having a mass fraction of 25%, and then added with 4 g of an anion exchange resin (Purolite®A520E). The temperature of the reactor was adjusted to 65° C., 40 ml of aqueous ammonia having a mass concentration of 5% was added in the reactor, and the reaction system was reacted for 2 h. Then, the temperature of the reactor was adjusted to 40° C., 10 ml of tetraethyl silicate and 100 ml of methanol were added in the reactor, and the reaction system was reacted for 4 h. Subsequently, the resin was separated from the mixture and then added with 20 ml of aqueous ammonia having a mass concentration of 5%, 10 ml of tetraethyl silicate and 100 ml of methanol, and the reaction system was reacted for 2 h at 40° C. At the end of reaction, the resin was dried. The performances of the synthesized magnetic resin were shown in Table 1.

Embodiment 10

40 g of ferric sulfate hydrate and 8 g of ferrous sulfate hydrate were dissolved in water to obtain iron salt solution having a mass fraction of 40%, and then added with 2 g of a magnetic acrylic strong base anion exchange microsphere resin (the resin disclosed in Chinese Patent CN101781437A). The temperature of the reactor was adjusted to 90° C., 10 ml of aqueous ammonia having a mass concentration of 10% was added in the reactor, and the reaction system was reacted for 1 h. Then, the temperature of the reactor was adjusted to 70° C., 10 ml of tetraethyl silicate and 50 ml of ethanol were added in the reactor, and the reaction system was reacted for 6 h. Subsequently, the resin was separated from the mixture and then added with 10 ml of aqueous ammonia having a mass concentration of 10%, 10 ml of tetraethyl silicate and 50 ml of ethanol, and the reaction system was reacted for 1 h at 70° C. At the end of reaction, the resin was dried. The performances of the synthesized magnetic resin were shown in Table 1.

Embodiment 11: The performances of the resin were measured by the following methods in the above embodiments, and the specific data was shown in Table 1.

Fe content: for the measurement of the Fe content, please refer to HJ 781-2016: Solid waste. Determination of 22 metal elements. Inductively coupled plasma optical emission spectrometry.

Si content: for the measurement of the Si content, please refer to GB/T 14506.28-2010: Methods for chemical analysis of silicate rocks.

True density in wet state: for the measurement of the true density in wet state, please refer to GB 8330-87: Methods for the determination of true density of ion exchange resins in wet state.

Bulk density in wet state: for the measurement of the bulk density in wet state, please refer to GB 8331-87: Methods for the determination of bulk density of ion exchange resins in wet state.

Fe dissolution rate: for the Fe dissolution rate, please refer to the dissolution of Fe in the magnetic resin after the magnetic resin is immersed in 1 mol/L hydrochloric acid solution.

Sphericity after attrition: for the measurement of the sphericity after attrition, please refer to GB/T 12598-2001: Determination for sphericity of ion exchange resins after attrition or osmotic-attrition.

Moisture holding capacity: for the measurement of the moisture holding capacity, please refer to GB/T 5757-2008: Determination of moisture holding capacity of ion exchange resins.

Deposition rate: for the measurement of the deposition rate, please refer to Chen Xiuzhi, et al., Hydraulic Property Tests of D113 Weak Acid Exchange Resins[J]. Journal of University of Science and Technology Beijing, 2001,23(5): 398-400.

Exchange capacity: for the measurement of the exchange capacity, please refer to GB/T 11992-1989: Strong basic anion exchange resins in chloride form-Determination of exchange capacity.

TABLE 1

| Magnet resin | Fe content (%) | Si content (%) | True density in wet state (g/mL) | Bulk density in wet state (g/mL) | Fe dissolution rate (%) | Sphericity after attrition (%) | Moisture holding capacity (%) | Deposition rate (m/h) | Exchange capacity (mmol/g) |
|---|---|---|---|---|---|---|---|---|---|
| Embodiment 1 | 36 | 2.211 | 1.5 | 0.73 | 0.5 | 98 ± 1 | 62.4 | 91.77 | 3.98 |
| Embodiment 2 | 31 | 1.837 | 1.3 | 0.76 | 1.0 | 89 ± 3 | 45.9 | 74.43 | 3.73 |
| Embodiment 3 | 26 | 1.348 | 1.1 | 0.76 | 1.6 | 82 ± 5 | 47.9 | 87.34 | 2.97 |
| Embodiment 4 | 30 | 1.798 | 1.3 | 0.73 | 0.6 | 93 ± 2 | 51.7 | 82.59 | 4.04 |
| Embodiment 5 | 34 | 1.956 | 1.4 | 0.68 | 0.5 | 96 ± 2 | 63.9 | 86.33 | 3.54 |
| Embodiment 6 | 28 | 1.468 | 1.2 | 0.7 | 1.0 | 90 ± 2 | 46.1 | 76.49 | 3.62 |
| Embodiment 7 | 29 | 1.521 | 1.2 | 0.69 | 0.7 | 92 ± 3 | 46.4 | 85.66 | 3.93 |
| Embodiment 8 | 33 | 2.103 | 1.5 | 0.69 | 0.6 | 96 ± 1 | 65.0 | 85.49 | 3.82 |
| Embodiment 9 | 25 | 1.217 | 1.1 | 0.77 | 1.2 | 80 ± 3 | 48.2 | 87.49 | 3.02 |
| Embodiment 10 | 31 | 2.109 | 1.3 | 0.75 | 0.5 | 95 ± 2 | 50.8 | 84.32 | 4.15 |

What is claimed is:

1. A method for preparing a magnetic strong base anion exchange resin, wherein the magnetic strong base anion exchange resin is strong base anion exchange resin particles, the resin particles contain iron-containing magnetic particles, and the surface of the resin particles are coated with silica, the method comprising the following steps of:

(1) preparing iron salt solution containing trivalent iron salt and divalent iron salt, adding a strong base anion exchange resin to the iron salt solution, and mixing uniformly; a ratio of total mass of valent iron salt and the divalent iron salt is 1:7.5 to 1:48; the mass ratio of the trivalent iron salt to the divalent iron salt in the iron salt solution is 1:1 to 5:1;

(2) separating the strong base anion exchange resin from the mixture obtained in the step (1), drying, and reacting with aqueous ammonia at 35° C. to 95° C.;

(3) adding silane coupling agent and alcohol to the reaction solution obtained in the step (2), or adding alcoholic solution of silane coupling agent to the reaction solution obtained in the step (2), and reacting at 25° C. to 75° C.; and (4) separating the strong base anion exchange resin from the reaction solution obtained in the step (3), and then adding silane coupling agent, alcohol and aqueous ammonia; or, separating the strong base anion exchange resin from the reaction solution obtained in the step (3), and then adding alcoholic solution of silane coupling agent and the aqueous ammonia; and, reacting at 25° C. to 75° C.; drying to obtain the magnetic strong base anion exchange resin; wherein the magnetic strong base anion exchange resin has a strong base anion exchange capacity of 2.0 to 4.3 mmol/g, a moisture holding capacity of 40% to 70%, a Fe content of 20% to 40%, an Si content of 0.001% to 2.212%, a Fe dissolution rate of 0.5% to 2.1%, a sphericity after attrition of 80% to 99%, a true density in wet state of 1.1 to 1.5 g/mL, a bulk density in wet state of 0.7 to 1.0 g/mL, and a deposition rate of 65 to 100 m/h in pure water at 25° C.;

in the step (2) or (4), the mass ratio of the resin to ammonia in the aqueous ammonia is 1:0.2 to 1:3.5; the mass fraction of the ammonia in the aqueous ammonia water is 10 to 32%;

in the step (3) or (4), the silane coupling agent is tetraethyl silicate or vinyltrimethoxysilane; the alcohol is methanol or ethanol; the ratio of the strong base anion exchange resin and the silane coupling agent is 1:0.2 to 1:5 g/mL by mass-to-volume; the ratio of the silane coupling agent to the alcohol is 1:5 to 1:50 by volume.

2. The method for preparing the magnetic strong base anion exchange resin according to claim 1, wherein, in the step (1), the trivalent iron salt is one or more selected from the group consisting of ferric chloride hydrate, ferric sulfate hydrate and ferric nitrate hydrate; the divalent iron salt is one or more selected from the group consisting of ferrous chloride hydrate, ferrous sulfate hydrate and ferrous nitrate hydrate; the mass fraction of the iron salt solution is 5% to 50%, optionally 5% to 40%; and the ratio of the mass of the strong base anion exchange resin to the total mass of the trivalent iron salt and the divalent iron salt is 1:3 to 1:60, optionally 1:7.5 to 1:48.

3. The method for preparing the magnetic strong base anion exchange resin according to claim 1, wherein in the step (2), the reaction time is 0.5 h to 3 h.

4. The method for preparing the magnetic strong base anion exchange resin according to claim 1, wherein the strong base anion exchange resin particles are acrylic strong base anion exchange resin particles, and the iron-containing magnetic particles are $Fe_3O_4$ nanoparticles or $Fe_2O_3$ nanoparticles.

* * * * *